United States Patent [19]

Jones

[11] 4,082,968
[45] Apr. 4, 1978

[54] SPEED DETECTOR FOR USE ON A DC MOTOR

[75] Inventor: Donald H. Jones, Pittsburgh, Pa.

[73] Assignee: Contraves-Goerz Corporation, Pittsburgh, Pa.

[21] Appl. No.: 744,395

[22] Filed: Nov. 23, 1976

[51] Int. Cl.$^2$ ............................................. H02K 11/00
[52] U.S. Cl. .................................. 310/68 B; 310/113; 310/154; 310/155; 310/168; 318/326
[58] Field of Search .................. 318/326, 327; 310/68, 310/68 B, 168, 152, 155, 154, 113, 181–187

[56] References Cited

U.S. PATENT DOCUMENTS

| | | | |
|---|---|---|---|
| 1,998,409 | 4/1935 | Klaiber | 310/155 |
| 2,541,422 | 2/1951 | Kirkland et al. | 310/16 UX |
| 3,466,477 | 9/1969 | Newill | 318/326 X |
| 3,480,812 | 11/1969 | Hershberger | 310/168 |
| 3,719,841 | 3/1973 | Ritsema | 310/155 |
| 3,967,200 | 6/1976 | Tetsugu et al. | 310/113 X |
| 3,970,979 | 7/1976 | Montagu | 310/168 X |

Primary Examiner—Donovan F. Duggan
Attorney, Agent, or Firm—Robert D. Yeager; Howard G. Massung

[57] ABSTRACT

A speed detector, particularly useful on a permanent magnet DC motor, for providing a pulse indication from movement of the rotor teeth. During one revolution of the motor, a pulse is provided for each motor tooth. In a preferred embodiment, the pulse pickup probe is formed from a ferromagnetic stud which is anchored to the stator housing and extends through an opening formed in the center of the fixed permanent magnet to a position in close proximity to the rotor. The magnet through which the probe extends provides magnetic flux having a path through the stud and the rotor. The reluctance of the flux path through the rotor varies as a function of the alignment of a rotor tooth with respect to the ferromagnetic stud. The stud is formed to have a pickup end facing the rotor. The diameter of the pickup end is slightly greater than the rotor tooth width. A pickup coil is wound around a reduced diameter portion formed on the ferromagnetic stud, and generally lies within the opening through the permanent magnet. As a rotor tooth passes across the pickup end of the stud, a voltage pulse is induced in the pickup coil. The speed with which these voltage pulses are produced indicates motor speed. A small opening or openings extend from the head of the stud towards the reduced diameter portion for receiving leads which are connected to the pickup coil. A diode can be electrically connected to the pickup coil to produce a unidirectional pulse output.

12 Claims, 6 Drawing Figures

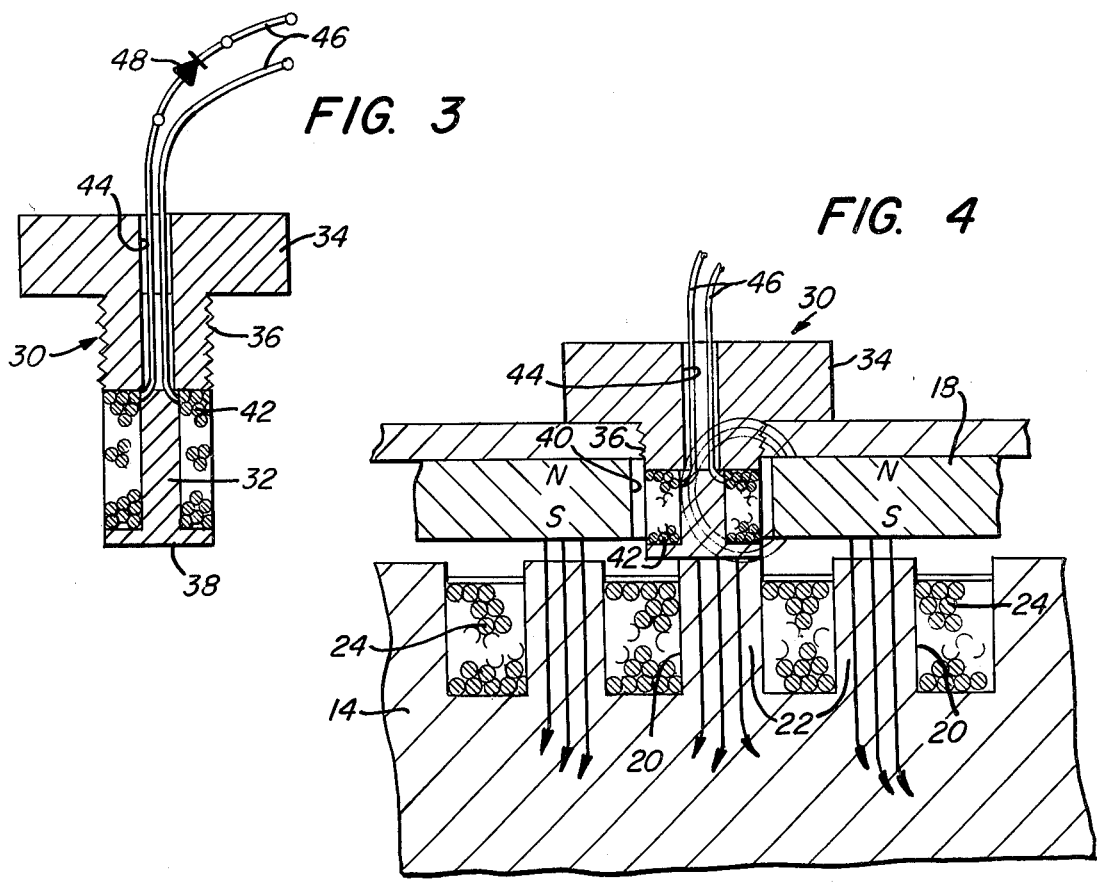
FIG. 3
FIG. 4
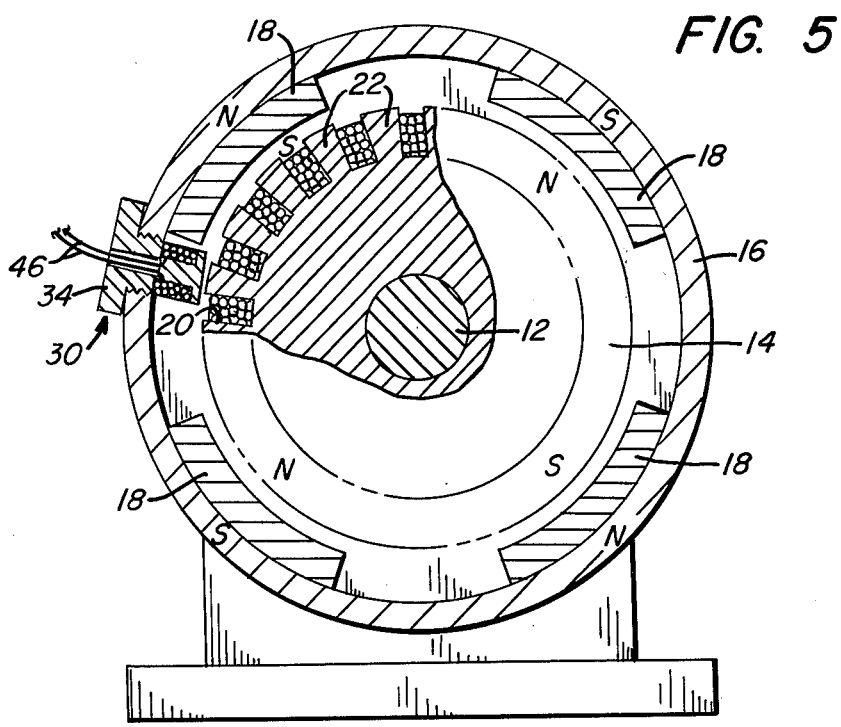
FIG. 5

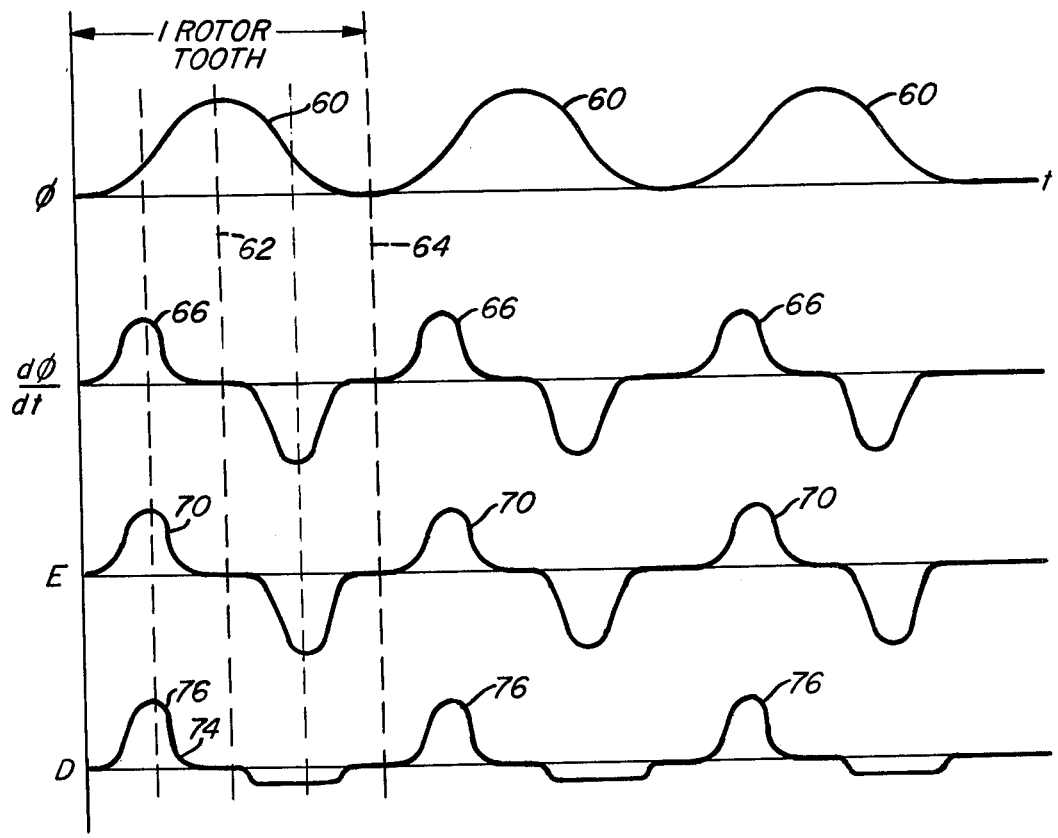

SPEED DETECTOR FOR USE ON A DC MOTOR

BACKGROUND OF THE INVENTION

1. Field of the Invention

This invention is related to a motor speed detector and more particularly to a pulse pickup on a DC motor responsive to flux variations caused by movement of rotor teeth.

2. Description of the Prior Art

A great deal of prior art has been developed for detecting motor speed. A common approach that has been used for many years to obtain a pulse pickup indicative of speed is to connect an external gear to rotate with the motor shaft. Each time a gear tooth passes a proximity sensor, a pulse is generated. The sensor is often formed with a permanent magnet coupled through the gear to sensor windings. As the gear rotates, the reluctance of the magnetic flux path varies as a function of the position of the gear teeth generating a series of pulses indicative of motor speed. Exemplary of these types of digital sensors are U.S. Pat. Nos. 3,366,874; 3,688,306; 3,846,697; and 3,876,927. A problem with the sensors disclosed in these prior art patents is that it must be physically mounted to the rotor shaft of the motor whose speed is being sensed. Mounting the detector may present a problem since the motor shaft is generally driving some type of mechanical apparatus and room to mount the additional gear detector may not be available. A special motor having a take-off shaft at both ends, one of which is used for mounting the gear speed detector, may be required.

Some prior art motors include a speed detector mounted in a commmon housing. U.S. Pat. No. 3,790,832 which discloses an integral motor and tachometer is exemplary of such devices.

Various patents have disclosed apparatus for remote sensing of motor rotation. In some of these sensors, no modification of the motor is required. The speed sensor may be physically displaced from the motor housing. These sensors are normally effected by the motor magnetic field which is external to the motor. Exemplary of these type of apparatus are U.S. Pat. No. 3,188,620 and U.S. Pat. No. 3,404,339.

U.S. Pat. No. 3,466,477 discloses a motor speed sensing apparatus for use on an induction motor. In the apparatus disclosed in this patent, a pair of magnetic coil transducers are placed on opposite ends of the stator tooth portion. The induction machine rotor includes slots oriented at an angle with respect to the axis of the stator so that rotation of the rotor causes different induced currents in the coil transducers. The induced currents are combined to produce an output signal representative of the rotor speed.

U.S. Pat. No. 3,942,114 discloses a speed detector for a DC motor. The DC motor input voltage and a signal related to the input current are supplied to the speed detector system which is coupled substantially in parallel with the motor. The speed indicating system utilizes these inputs to generate a voltage proportional to the speed of the DC motor.

In many industries, such as food processing, there are a great number of small motors which must be synchronized. The degree of synchronism required, however, is not so great as to justify a really high precision positioning control. A problem with prior art speed detecting devices is that they are relatively expensive. Also, many of the prior art speed detectors require extensive modification of the motor and its electrical or mechanical connections. To be commercially viable for many industries, the pulse pickup must be very inexpensive. It is desirable to have a relatively inexpensive pulse pickup which is rugged, simple, easily installed and provides a digital signal related to motor speed.

SUMMARY OF THE INVENTION

A speed pulse pickup, for use on a DC motor, which senses magnetic flux variations caused by rotor teeth as the motor operates. In a DC motor having a stator formed with permanent magnets, a pulse pickup probe is formed from a stud of ferromagnetic material. The pickup probe extends through one of the permanent magnets into close proximity with the rotor. Preferably, the stud extends through the permanent magnet at a position where the magnetic flux field due to the current through the armature windings is zero or small. A threaded opening is formed in the stator housing which is engaged by threads formed on the ferromagnetic stud. The ferromagnetic stud includes a headed portion which engages the housing when the stud is secured in place. A reduced diameter portion is formed on the stud around which is formed a pickup coil winding. A passage is formed through a portion of the stud to receive external leads which are connected to the pickup windings. The leads conduct the pulse pickup signal to a sensing circuit external to the motor. An epoxy seal is provided between the stud and the external leads.

The ferromagnetic stud includes a reduced diameter portion formed intermediate the ends around which the sensing coil is wound. The ferromagnetic stud can be a standard hex head bolt with a reduced diameter portion machined out. The bolt is selected to be a good flux conductor. The sensing coil is disposed generally within the opening formed in the permanent magnet when the speed sensor is in place. The free end of the ferromagnetic stud is positioned in close proximity to the rotor. The free pickup end of the stud is of a diameter less than the thickness of two motor teeth. The sizing of the pickup end of the ferromagnetic stud can be formed to obtain the best pulse pickup for a given type motor. The size of the tooth must be small enough so that magnetic flux is not averaged out across several teeth. If the pickup end is too small, however, the pulse output is of lower amplitude. The size of the hole formed in the permanent magnet is relatively small compared with the overall size of the permanent magnet, so that the loss of the magnetomotive force (MMF) through this opening is relatively small. By positioning the opening near the center of the permanent magnet, the armature magnetic flux produced by the current in the rotor conductors is near zero and the pulse output is not significantly effected by the current flow in the rotor. The reluctance coupling of the magnetic flux path through the rotor varies as the rotor rotates, and is dependent on the position of the pickup probe with respect to the rotor teeth. The pulse pickup is thus insensitive to flux variations in the armature but sensitive to reluctance variations as the armature turns. When a rotor tooth is aligned with the pickup probe, the reluctance of the magnetic path through the probe is minimized. When a rotor slot is aligned with the pickup probe, the reluctance of the magnetic path is a maximum. A unidirectional device such as a diode can be connected in series with the pickup probe output leads so that the output electrical pulses are only of a single polarity.

The disclosed pulse pickup does not require, as is usual in the prior art, excitation of a separate permanent magnet or power supply. The pulse pickup is energized by the magnetism present to operate the motor.

In a preferred embodiment of the invention a DC motor comprises a cylindrical housing having magnetic means disposed around the interior of the housing for supplying a magnetic field. A ferromagnetic rotor is disposed within the housing having a plurality of slots formed therein defining rotor teeth. Armature windings extend within the slots between the rotor teeth. A ferromagnetic pickup stud is disposed so that a magnetic flux path, for a small portion of the magnetic flux generated by the magnetic means, extends through the stud and through the rotor. The reluctance of this magnetic flux path varies as a function of rotor tooth position with respect to the longitudinal axis of the pickup stud. When a rotor tooth is aligned with the center of the ferromagnetic stud the reluctance of the path is a minimum, while, as the rotor tooth moves away from the center of the stud the reluctance of the magnetic path increases. A pulse pickup coil which is disposed around the ferromagnetic stud has a varying electric signal induced therein due to flux variations as the rotor moves. The pickup stud may be disposed along side the magnet means, but it is preferably positioned through the center of the magnetic means so the armature flux effect is minimized. The stator magnetic flux may be generated by permanent magnets, one of which has a hole formed in the center thereof, through which the pickup stud extends. The stud includes a reduced diameter portion positioned in the permanent magnet hole, around which the pickup coil is wound. In a permanent magnet DC motor, the magnetic pole axis of the permanent magnets is disposed along a radius from the center of the motor. That is, one pole of each magnet will be facing the rotor and the other pole will be facing away from the rotor. Thus, magnetic flux will extend through the opening formed in the center of the magnet from one magnetic pole to the opposite magnetic pole. The stud provides a low reluctance path for the passage of magnetic flux.

Since the permanent magnets are cast, an opening can be formed therethrough for a very small cost. The pickup probe can be formed from a standard bolt, with little machining required. The pulse sensor is thus a very inexpensive item. The sensor is ruggedly constructed and can easily be installed.

It is an object of this invention to teach a pulse pickup for use with a permanenet magnet motor wherein a ferromagnetic stud extends in proximity to the rotor, and provides a path for coupling magnetic flux from the permanent magnet to the rotor and wherein the path's reluctance varies as the rotor moves.

It is another object of this invention to teach a motor pulse pickup for use with a permanent magnet DC motor which is very inexpensive, rugged and easy to install.

It is a further object of this invention to teach a speed pulse pickup which utilizes the permanent magnets of a DC motor for generating a pulse output.

BRIEF DESCRIPTION OF THE DRAWINGS

For a better understanding of the invention, reference may be had to the preferred embodiments shown in the accompanying drawings wherein:

FIG. 3 is a section view of the pulse pickup probe used for practicing the teaching of the present invention;

FIG. 4 is an enlarged view of a portion of the motor shown in FIG. 2;

FIG. 5 is a section view similar to FIG. 2 of another embodiment of the present invention; and, FIG. 6 is a graphic representation of the waveforms of various flux and voltage signals associated with the pulse pickup.

DETAILED DESCRIPTION OF THE PREFERRED EMBODIMENT

Figure 1:
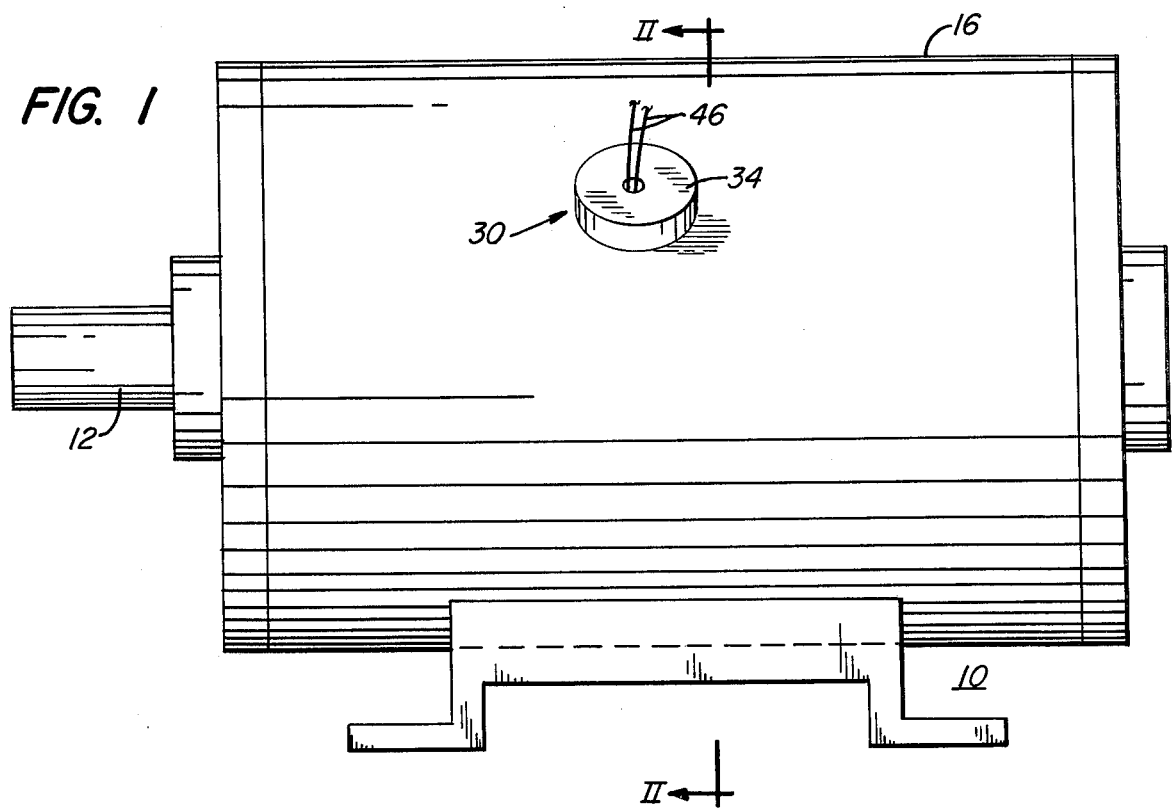
FIG. 1 is a side view of a permanent magnet DC motor utilizing the teaching of the present invention.
Figure 2:
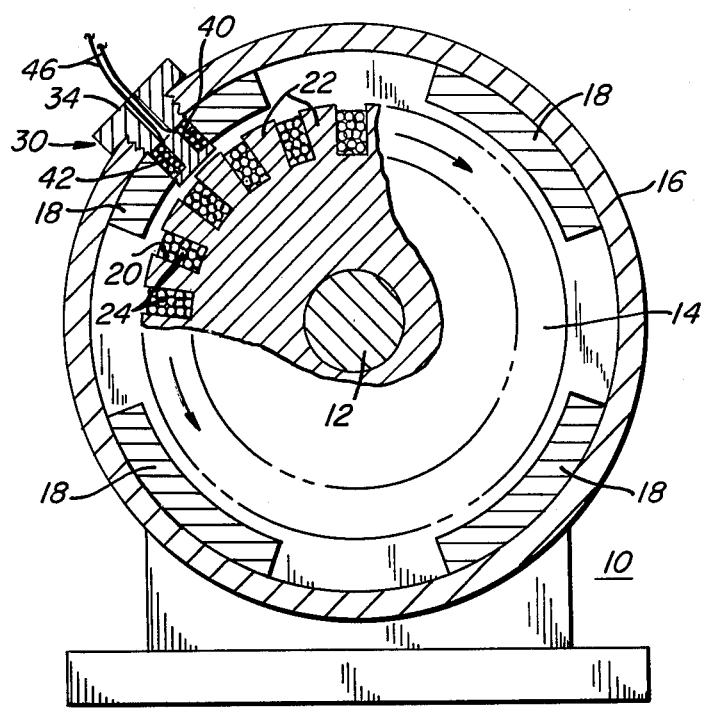
FIG. 2 is a section view of the motor shown in FIG. 1 along the lines II—II.

Referring now to the drawings and FIGS. 1 and 2 in particular, there is shown a permanent magnet DC motor 10 utilizing the teaching of the present invention. Motor 10 includes an output shaft 12 which is connected to the load to be driven. Shaft 12 is connected to and forms a part of rotor 14 which is disposed within a housing 16. Rotor 14 is supported for rotary movement within housing 16. Housing 16 forms a stator of a permanent magnet DC motor 10. Disposed around the interior of the stator 16 are a plurality of permanent magnets 18. The poles of these magnets are aligned radially from the center of motor 10. That is, one pole of the permanent magnet 18 is facing the rotor, while the other pole is engaging or in close proximity to housing 16. Permanent magnets 18 provide the field excitation for motor 10. That is, permanent magnets 18 provide the magnetic field with which the magnetic field, produced by the armature current, reacts to rotate motor shaft 12. Rotor 14 is formed from a ferromagnetic material usually made up of laminations. A plurality of slots 20 are formed around the periphery of rotor 14. These slots 20 define rotor teeth 22 which are formed at the outer surface of rotor 14. Disposed between teeth 22 in slots 20 are the armature windings 24. Magnetic flux paths from the permanent magnets 18 extend through the rotor teeth which are in proximity to the inward facing pole, through the rotor to an inward facing pole of an adjacent magnet. The inward facing poles of adjacent magnets 18 are of an opposite polarity. The return paths for the magnetic flux lines are through the housing 16 which is formed of a ferromagnetic material. The magnetic field produced by armature windings 24 react with the fields produced by permanent magnets 18 to rotate rotor 14. The current flowing through armature windings 24 determines the armature field strength and rotational torque of rotor 14.

In many applications, it is necessary to know the speed of rotor 14. The present invention teaches apparatus for generating a pulse each time a rotor tooth passes sensor 30. The speed at which these pulses are generated will indicate rotor speed. One of the permanent magnets 18 has a relatively small opening formed therethrough within which the probe 30 extends when installed. Permanent magnets 18 are usually formed by a casting process and an opening formed therein can be obtained at little additional cost from the magnet manufacturer. The pickup probe 30 is shown in more detail in FIGS. 3 and 4. Probe 30 can be formed from a ferromagnetic bolt having a reduced diameter portion 32 formed intermediate the ends thereof. A portion of the probe 30 includes a headed portion 34 which is exposed when the probe is installed. A section 36 of the probe 30 in proximity to the head 34 is threaded so that when probe pickup 30 is installed in a threaded opening, formed in stator 16, the probe 30 is securely held in position with the head 34 in close proximity to stator housing 16. The free end of pickup 30 forms a flux pickup face 38 which is positioned in close proximity to rotor 14. A winding 42 is formed around the reduced diameter portion 32 to sense flux variations in portion 32. A small opening 44 extends from the head 34 to the reduced diameter portion 32 providing a passage for leads 46 which are electrically connected to winding 42. Reduced diameter portion 32 provides the core for winding 42. With the sensor installed as shown in FIGS. 2 and 4, reduced diameter portion 32 and winding 42 are positioned within the opening 40 of permanent magnet 18.

As best shown in FIG. 4, pulse pickup 30 provides a path for some of the flux from permanent magnet 18 from one pole to the other pole. The flux path extends through rotor 14. When a rotor tooth 22 is aligned with or under flux pickup head 38, the reluctance of the magnetic flux path is a minimum. As the rotor tooth moves the reluctance increases until it is a maximum where the rotor slot 20 is aligned with the center of pickup 30. Thus, as rotor 14 moves, the reluctance of the flux path through pickup 30 varies as a function of the rotor tooth alignment. The pulse pickup 30 is energized by permanent magnets 18 and requires no additional energy source.

The field flux which passes through the opening 40 detracts slightly from the flux available for operating the motor 10. However, the opening 40 is very small when compared with the area of the magnet 18 face. That is, the flux for operating the motor is only very slightly reduced by having the hole 40 with the sensor 30 positioned therein. The size of the flux pickup head 38 is critical in getting a good pulse output. If the size of the pickup is too small, the pulse pickup is of a poor quality. If the flux pickup head 38 is too big then the flux is averaged over several teeth which is undesirable. The sides of the flux pickup head should preferably be less than twice the width of a rotor tooth 22. Although larger properly selected widths can provide a usable pulse output.

In operation, it is desirable that the flux variations through the core 32 of winding 42 be only affected by the variations in the reluctance of the magnetic flux paths due to rotor 14 movement. That is, it is desirable that flux generated by the armature, which can vary, not effect the pulse voltage output of coil 42. By forming the opening at the center of the permanent magnet 18 where the armature reaction on the motor is zero, variations caused by changing flux due to armature current can be minimized. The output from coil 42 when positioned in the center of permanent magnet 18 will be primarily affected by the change in reluctance of the magnetic path through the rotor 14 and the sensor circuit.

Referring to FIG. 6, there is shown a graphic representation of the various flux and voltage waveforms associated with pulse pickup 30. In FIG. 6, the top curve 60 shows the variation in flux as the rotor moves. At point 62, a tooth 22 is aligned with pickup probe 30 while at point 64, a slot 20 is aligned with pickup probe 30. Curve 66 shows the derivative of the flux with respect to time. The flux is designated phi, $\phi$, and the change in flux with respect to time is $d\phi/dt$. The voltage, E, generated in pickup coil 42 is equal to $K\, d\phi/dt$, and is shown as curve 70. A diode is electrically connected across the output pulse pickup 30 and chops one polarity of voltage pulse. The output of pulse pickup 30 is shown as curve 74. Each pulse 76 indicates one rotor tooth 22 has passed probe 30. If desired, pulses 76 can be shaped by an appropriate shaping circuit. As shown schematically in FIG. 3, a diode 48 is connected in series with lead 46. Thus, only a single pulse 76 of one polarity is generated each time a rotor tooth passes pickup 30.

With the probe 30 in place, there is some fringing direct flux from permanent magnet 18 which only links through probe 30. This will not generate an output in coil 42 since coil 42 only picks up changes in flux, $d\phi/dt$.

Referring now to FIG. 5, there is shown an embodiment of the invention which might be used primarily on existing motors. In this embodiment, the probe 30 does not extend through the magnet 18 but is located in proximity to the side of permanent magnet 18. At this point, a flux path is formed through probe 30 around permanent magnet 18. However, in this location, armature reaction flux is not zero and this must be taken into account. Also, by putting pickup 30 alongside magnet 18, the amount of flux shunted around the magnet is reduced.

The teaching of this invention can be applied to DC motors which do not have permanent magnets. However, the construction and installation is more difficult. This construction of the field pieces which generate the field for the DC motor must have an opening formed therein to receive the probe. Since the field pieces are made of laminations, it would require the holes being individually formed in the laminations before they are stacked. It would be undesirable to drill through all the laminations when in place since this could short them out. Another problem associated with using the disclosed apparatus on DC motors without permanent magnet stators is that the magnetic field generated might have some variations due to the line frequency. The flux generated by the permanent magnet is a constant DC flux, while the flux generated in a DC motor using electromagnets may be obtained from current supplied by a full wave bridge rectifier and this could have some 120 hertz variations. These variations would have to be eliminated or compensated for to provide a good output signal. Thus, the use of the teaching of this invention on a permanent magnet DC motor is more straightforward.

The opening for receiving the lead wires 46 can be a single opening or two small openings. The opening extends longitudinally partially through stud 30. The opening or openings formed in the head 34 of sensor 30 are sealed with epoxy. This provides a sensor 30 which is very rugged and easy to manufacture. No expensive modifications are required for a permanent magnet DC motor which has a permanent magnet with an opening formed therethrough. The disclosed apparatus provides a very low cost easily mountable pickup for supplying pulse outputs which are related to the rotor speed. No external excitation for the probe is required. The number of pulses which are obtainable for one revolution of the motor is determined by the number of rotor teeth. The disclosed pulse pickup can be mounted on the motor without requiring attachment to the rotor shaft 12, and this eliminates problems of having to fit a sensor among the driven apparatus.

What is claimed is:

1. A permanent magnet motor comprising:

a stationary housing;

a plurality of permanent magnets supported within said stationary housing;

a rotor disposed within said stationary housing partially surrounded by said plurality of permanent magnets and being supported for rotational movement;

a plurality of rotor teeth formed on the outer surface of said rotor having armature windings disposed therebetween;

one of said permanent magnets having an opening formed therethrough;

a pickup stud formed of a magnetizable material connected to said housing and extending through the opening formed in said permanent magnet to a position in close proximity to said rotor; and, a pickup winding wound around a portion of said pickup stud for sensing a signal from the rotor teeth as said rotor revolves.

2. A permanent magnet motor as claimed in claim 1 comprising:

an opening formed partially through said stud; and, a pair of conductors connected to said pick up winding extending through said opening to a position external to said stationary housing.

3. A permanent magnet motor as claimed in claim 2 comprising:

a unidirectional conducting device electrically connected in series with one of said pair of conductors.

4. A motor comprising:

a stator defining a cylindrical opening;

plurality of magnets disposed around the inside of said stator;

a rotor, having a plurality of teeth, disposed for rotation within the opening in said stator;

a ferromagnetic stud connected to said stator and extending through one of said magnets into close proximity with said rotor; and, a pick up winding disposed around a portion of said stud having a signal induced therein, dependent on the position of the rotor teeth, as said rotor is moved.

5. A motor as claimed in claim 4 wherein said rotor comprises:

a plurality of armature windings through which motor load current can flow; and, said stud positioned to extend through said permanent magnet where the magnetic flux generated by the armature current is at a minimum.

6. A DC motor comprising:

a cylindrical housing;

magnet means disposed around the interior of said cylindrical housing for supplying a magnetic field;

a ferromagnetic rotor disposed within said housing;

a plurality of teeth formed on said rotor with armature windings disposed between said teeth;

a ferromagnetic stud extending through said housing into close proximity with said ferromagnetic rotor;

said ferromagnetic stud disposed so a path for the magnetic flux from said magnet means is formed through said rotor and said ferromagnetic stud, whose reluctance is a function of the relative position of said rotor teeth with respect to said stud; and, a pulse pick up coil is disposed around said ferromagnetic stud for providing a varying electrical signal as said rotor moves.

7. A DC motor as claimed in claim 6 wherein:

said magnet means comprises a permanent magnet;

said ferromagnetic stud is disposed through an opening formed in said permanent magnet; and, the opening formed in said permanent magnet is at a position where the flux generated by the armature through said ferromagnetic stud is at a minimum.

8. A DC motor as claimed in claim 7 wherein:

said housing comprises a threading opening formed therein; and said stud comprises, a headed end;

a threaded portion formed next to said headed end for engaging the threaded opening formed in said housing;

a flux pick up head formed at the free end of said stud;

a reduced diameter portion formed between said threaded portion and said flux pick up head to receive said pulse pick up coil; and, said pulse pick up coil disposed within the opening in said permanent magnet when said stud is installed.

9. A DC motor as claimed in claim 8 wherein:

said flux pick up head is of a diameter less than the width of two rotor teeth.

10. A DC motor as claimed in claim 9 wherein:

said stud has an opening formed therein, extending from the headed end to the reduced diameter portion; and, a pair of leads connected to said pick up coil extending external to said housing through the opening formed in said stud.

11. A DC motor as claimed in claim 10 comprising:

a diode electrically connected to one or more of said pair of leads.

12. A permanent magnet DC motor comprising:

a generally cylindrical housing formed from a ferromagnetic material;

a plurality of permanent magnets connected to the inside of said cylindrical housing at least one of which has an opening formed near the center thereof;

said cylindrical housing includes a threaded opening formed therein which is aligned with the opening formed in one of said plurality of permanent magnets;

a rotor, having a plurality of teeth within which are disposed the armature windings, supported for rotation within said cylindrical housing;

a pickup stud, having a headed end, a pickup end, a threaded portion formed between the headed end and the pickup end, and a reduced diameter portion formed between the threaded portion and the pickup end, disposed in threaded engagement with the threaded opening formed in said cylindrical housing with the pickup end in close proximity to said rotor;

a pickup winding disposed around the reduced diameter portion of said pickup stud having a signal induced therein dependent on the position of the rotor teeth, as said rotor moves;

a passage formed in said pickup stud communicating between the exposed headed end and the reduced diameter portion of said stud;

a pair of pickup leads connected to said pickup winding partially disposed in said passage and extending external to said cylindrical housing carrying the signal induced in said pickup winding; and, a diode connected in series with one of said pair of pickup leads.

* * * * *

UNITED STATES PATENT AND TRADEMARK OFFICE
CERTIFICATE OF CORRECTION

PATENT NO. : 4,082,968
DATED : April 4, 1978
INVENTOR(S) : Donald H. Jones

It is certified that error appears in the above-identified patent and that said Letters Patent are hereby corrected as shown below:

Column 1, line 35, "commmon" should read --common--.

Claim 4, line 3, before "plurality" --a-- should be added.

Claim 6, line 16, "is" should be deleted.

*Signed and Sealed this*

*Twenty-ninth* Day of *August 1978*

[SEAL]

Attest:

RUTH C. MASON
*Attesting Officer*

DONALD W. BANNER
*Commissioner of Patents and Trademarks*